C. MUSKOV.
CALORIC ENGINE.

No. 170,447.  Patented Nov. 30, 1875.

WITNESSES:
P. C. Dieterich
W. C. McArthur

INVENTOR:
Chas. Muskov
per
C. H. Watson & Co.
ATTORNEYS.

UNITED STATES PATENT OFFICE.

CHARLES MUSKOV, OF NEW YORK, N. Y.

IMPROVEMENT IN CALORIC-ENGINES.

Specification forming part of Letters Patent No. 170,447, dated November 30, 1875; application filed May 13, 1875.

*To all whom it may concern:*

Be it known that I, CHARLES MUSKOV, of New York, in the county of New York and State of New York, have invented certain new and useful Improvements in Caloric-Engines; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This device or invention relates to a method of producing power through the medium of steam or heat by means of the contraction and expansion of metal; and it consists in the combination of pipes and levers, as will be hereinafter more fully set forth.

Figure 1:
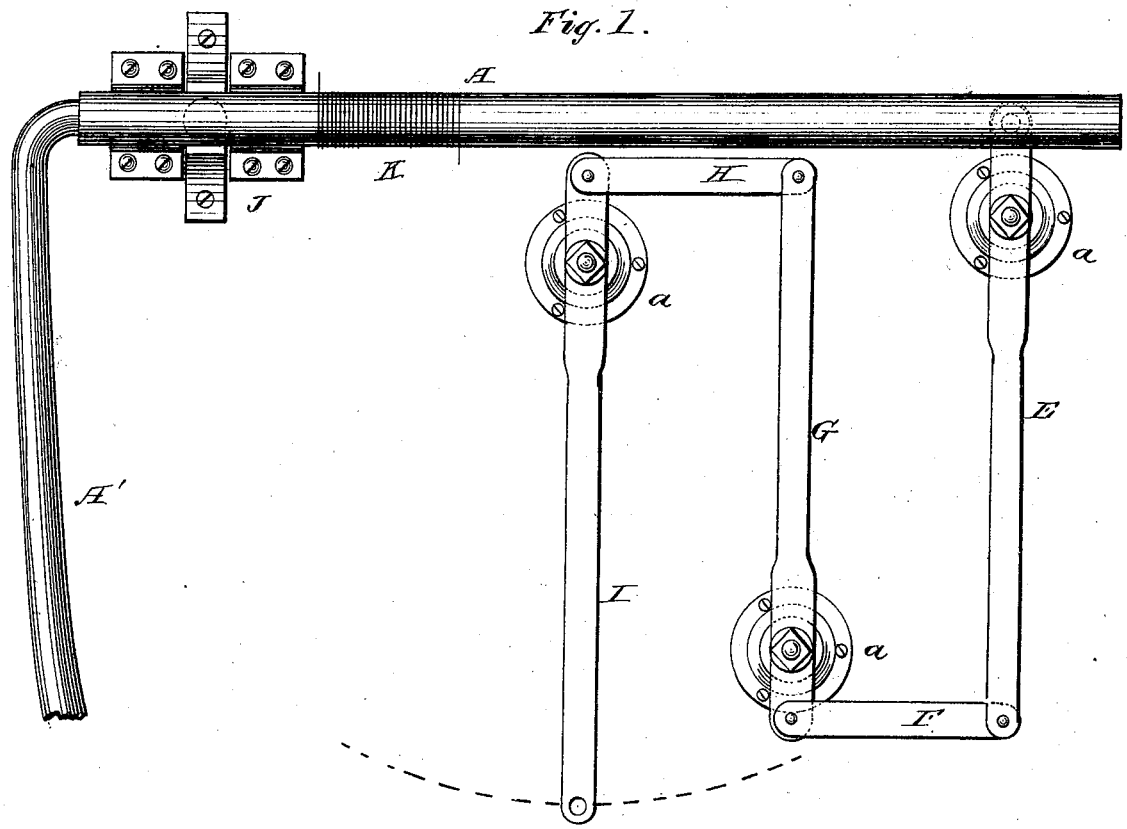
Figure 2:
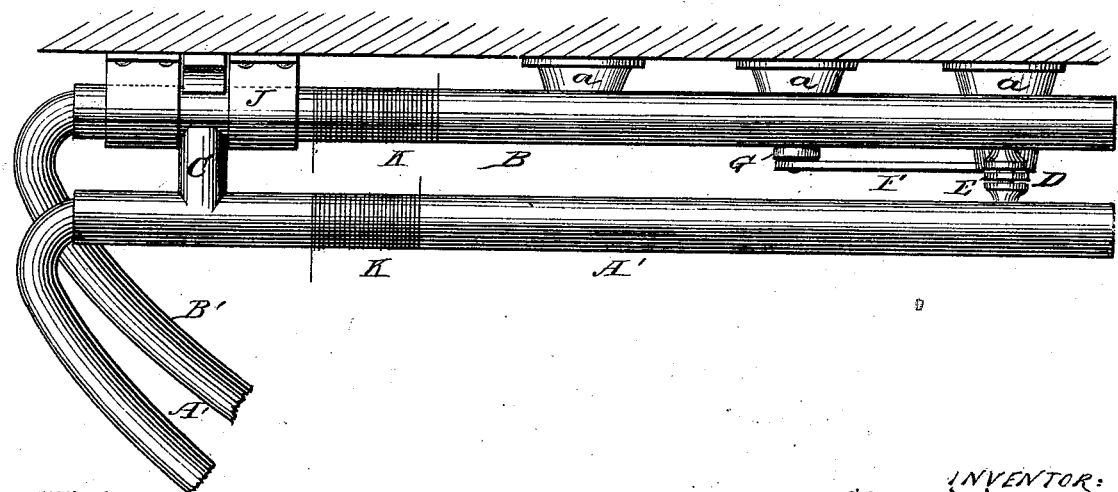

Referring to the annexed drawing, Figure 1 represents a plan view, and Fig. 2 a side elevation, of a device embodying my invention.

A and B represent two metal pipes of such metal as possesses the greatest expansive qualities, and at the same time having sufficient strength for the purpose for which they are used. To these pipes are attached at one end flexible tubes A' and B'. The pipes A B are connected by connection C. Near one end of the pipes A B the lever E is attached by connection D, and to the lever E is connected a system of levers, F, G, H, and I, having fulcrums at *a a a*. The pipes A and B are supported by a bracket, J, in any convenient position, or in any other manner desired, and pipes A B near the end where the heat enters. The pipes are to be wound or covered the entire length by any desired material, as shown at K, are to be provided with suitable cocks or valves, to be operated by suitable means, for a purpose hereinafter described, and the pipes A B may be provided with tubes similar to those represented by A' and B' at both ends.

The operation is as follows: The steam or other heat enters through the tube A' to the pipes A and B, which being heated expand, and move the lever E, which in turn operates the lever I, (through the system of levers described,) so that one end of the lever I moves, as shown in dotted lines in Fig. 1. The valve to be placed in the end of pipe A, or it may be placed in the tube A', is then closed, and the valve to be placed in the end of pipe B or tube B' is opened, and the heat or steam passes out into the tube B', which leads to a cold well, where steam is used, and the pipes A and B contract, which moves the lever I back. The action is thus repeated, and the lever I kept moving back and forth, and the power to be transmitted being taken from the free end of the lever I.

This invention is applicable to any place where power is required, and free from danger by explosion.

I am aware that valves have been opened by the heating and expanding pipes, and I lay no claim broadly to such device; but

Having thus fully described my invention, what I claim and desire to secure by Letters Patent, is—

The pipes A B and connection C, in combination with the lever-connection D, and the levers and the pipes, provided at one or both ends with the flexible tubes A' B' and covering K, all as and for the purpose set forth.

In testimony that I claim the foregoing as my own I affix my signature in presence of two witnesses.

CHARLES MUSKOV.

Witnesses:
   C. H. WATSON,
   H. C. SCOTT.